Nov. 18, 1952  E. E. MARTIN  2,618,107
TOOL RECIPROCATING DEVICE
Filed Aug. 16, 1949  2 SHEETS—SHEET 1
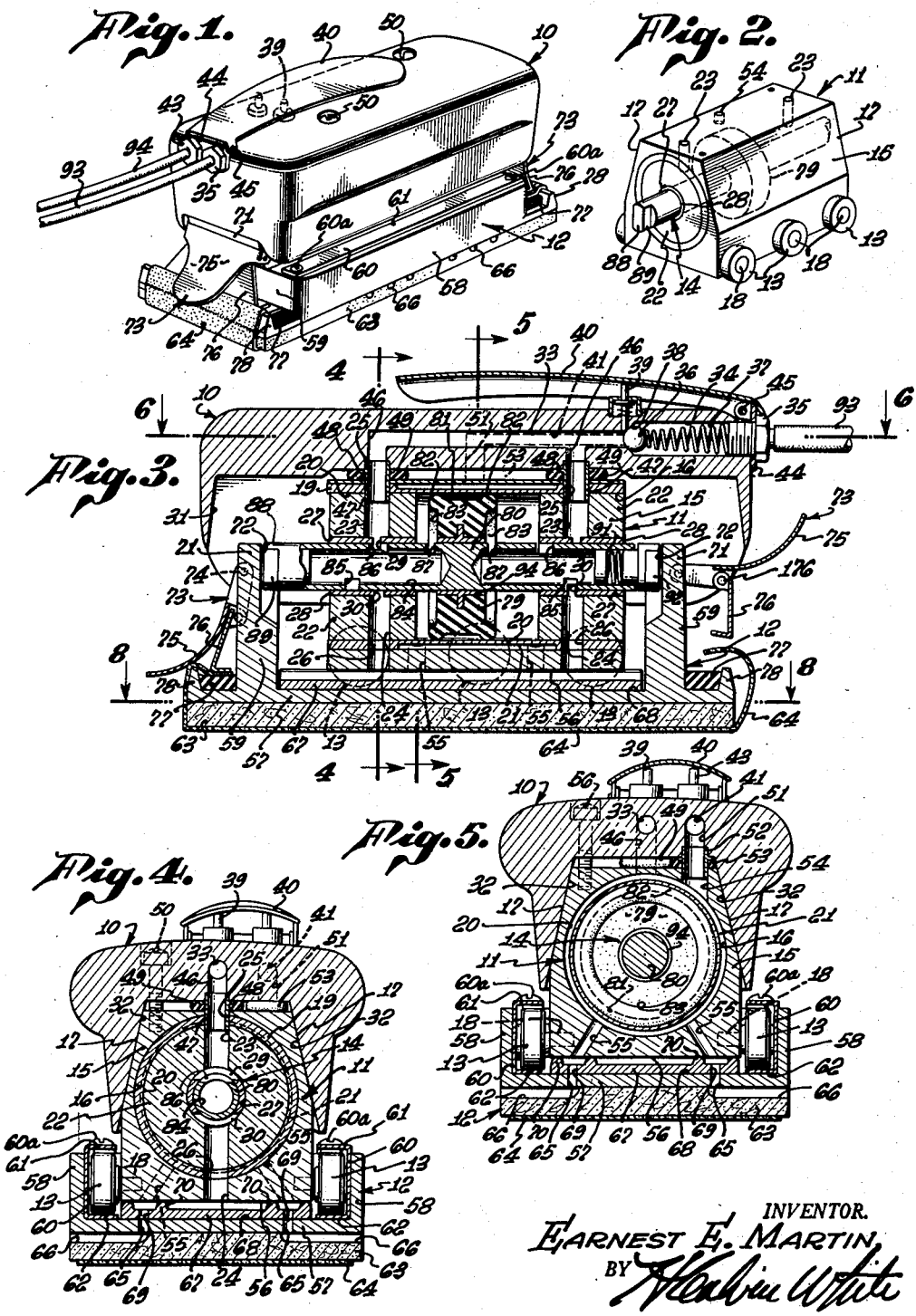
INVENTOR.
EARNEST E. MARTIN,
BY
ATTORNEY.

Nov. 18, 1952      E. E. MARTIN      2,618,107
TOOL RECIPROCATING DEVICE
Filed Aug. 16, 1949      2 SHEETS—SHEET 2
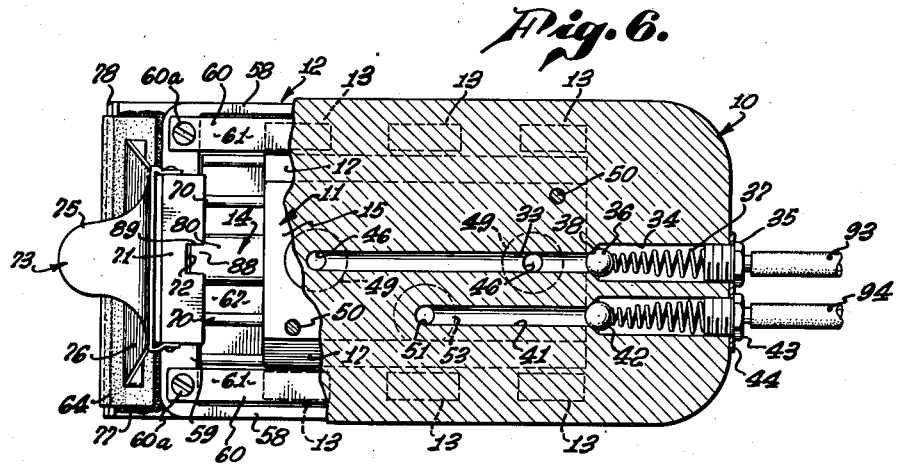
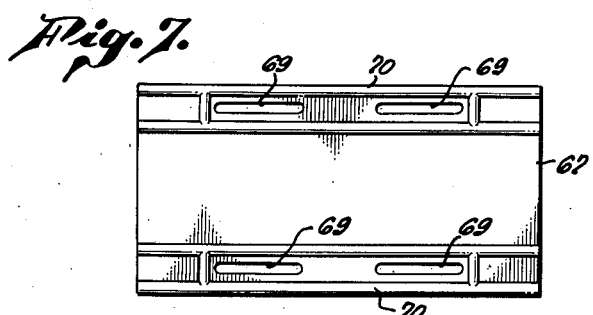
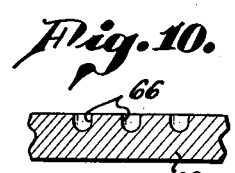
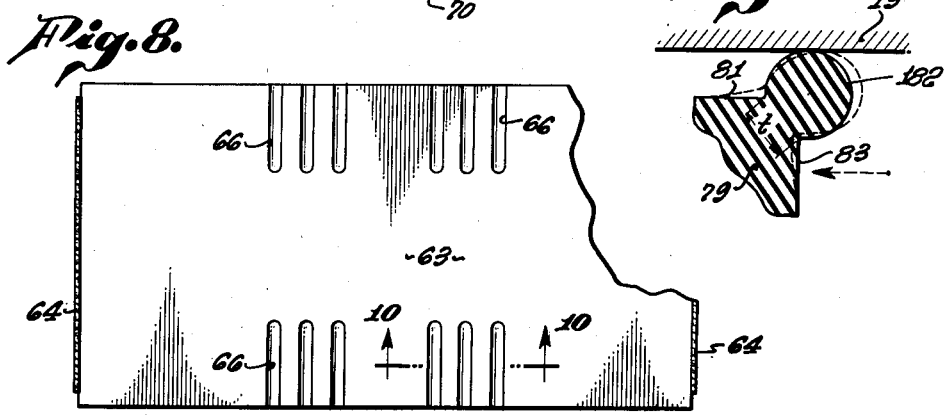
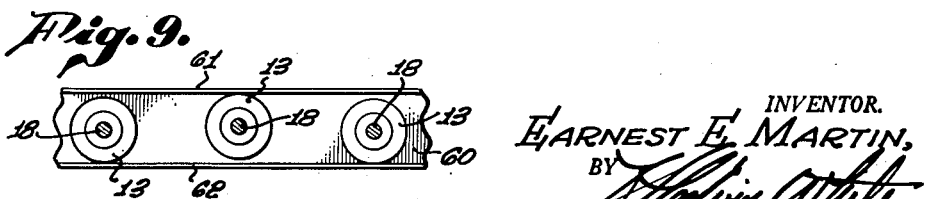
INVENTOR.
EARNEST E. MARTIN,
BY
ATTORNEY.

Patented Nov. 18, 1952

2,618,107

UNITED STATES PATENT OFFICE 2,618,107

TOOL RECIPROCATING DEVICE

Earnest E. Martin, Pasadena, Calif., assignor to Alma A. Hutchins, Pasadena, Calif.

Application August 16, 1949, Serial No. 110,521

19 Claims. (Cl. 51—170)

This invention relates generally to improved tool reciprocating apparatus, and particularly to fluid pressure actuated units adapted for use as portable sanders, filing devices, and the like.

As will appear, devices embodying the invention are especially characterized by a capacity for very high speed reciprocation over an extremely long useful life and with little or no necessity for repair or replacement of parts. Such length of life is attained as a result of several distinctive features serving to permit the use of relatively few moving parts so constructed and interrelated as to reduce wear to a minimum.

In a fluid pressure actuated tool of the present character, the power piston and its associated fluid control valves are usually far more susceptible to wear than any of the other parts. Further, very slight wear of the piston or valves has a relatively great effect on the operating efficiency of the device. Consequently, a particular object of the invention is to provide a piston and valve arrangement adapted for effective operation and yet so designed as to be comparatively free from wear under normal use. For this purpose, I preferably form the piston itself of a novel design to be at all times in relatively light engagement with the cylinder wall, while nevertheless forming an adequate fluid retaining seal. Particularly contemplated, in this connection, is a piston composed of wear-resistant rubber or similar resilient material.

To further reduce piston wear and to prevent appreciable valve wear, I employ a single unitary piston and valve assembly adapted for axial movement as a unit within a cylinder body and so mounted as to be substantially free of any transverse thrust against the body. In accordance with the invention, this piston and valve unit comprises a single piston having a pair of rods extending axially in opposite directions. The rods themselves preferably serve as valves to alternately admit pressure fluid to opposite sides of the piston. Transverse thrust on the piston and valve unit is prevented by mounting a movable tool carrying section of the device to its handle section by means entirely independent of the piston and valves. That is, the piston and valves do not in any sense guide the two sections for relative movement. Preferably, the two sections are movably interconnected by providing one with rotatable bearings engageable with a pair of tracks on the other section. As will appear, the bearings may be arranged in novel offset relation to minimize their wear during operation of the device.

In certain situations, it is desirable to supply a liquid, usually water, to the surface being sanded or otherwise treated by a reciprocating tool. An additional feature of this invention is to provide for the discharge of such a liquid through the two sections of the present device to a location immediately adjacent the surface being worked on.

The above and further features and objects of the present invention will be better understood from the following detailed description of the typical embodiment illustrated in the accompany drawings, in which:

Fig. 1 is a perspective view of a sanding device embodying the invention;

Fig. 2 is a perspective view of the power cylinder of the sander shown in Fig. 1;

Fig. 3 is an enlarged vertical section taken along the longitudinal central axis of the device;

Figs. 4 and 5 are transverse sections taken on lines 4—4 and 5—5, respectively, of Fig. 3;

Fig. 6 is a horizontal section through the handle, partly broken away, taken on line 6—6 of Fig. 3;

Fig. 7 is a plan view of the water sealing pad;

Fig. 8 is a plan view of the shoe cushion taken on line 8—8 of Fig. 3;

Fig. 9 is a detail view showing the relation between the cylinder carried wheels and the shoe carried tracks or guides;

Fig. 10 is an enlarged fragmentary section through the shoe pad taken on line 10—10 of Fig. 8; and Fig. 11 is an enlarged fragmentary view of the piston showing, in exaggerated form, its deformation during powered displacement.

The illustrated fluid operated sanding device comprises essentially a handle 10, a cylinder unit generally indicated at 11 and rigidly carried by the handle, a shoe 12 guided by bearings or rollers 13 on the cylinder for reciprocal movement relative to the handle and cylinder, and a unitary piston and valve assembly 14 mounted for axial movement within the cylinder and bearing against the shoe to effect its powered reciprocation.

The cylinder unit comprises a block or body 15 containing an inner cylindrical bore 16 and having the upper portions of its side walls tapered at 17 for engagement with the handle. Two sets of rollers 13 are carried by the cylinder body at its opposite sides, each roller being rotatably mounted by an individual stub shaft 18 embedded within the cylinder body. As seen best in Fig. 9, the central roller on each side is slightly higher than the two end rollers to achieve a purpose which will appear later.

A tubular liner 19 is received within bore 16 of the cylinder body, and itself presents a smooth bore 20 for receiving and engaging the piston. The outer surface of this liner contains a central annular recess 21 cooperating with bore 16 of the cylinder body to form a water jacket about the cylinder walls. At its ends, liner 19 contains a pair of plugs or cylinder heads 22, each having an upwardly extending pressure fluid inlet passage 23 and a downwardly extending exhaust passage 24. As seen in Fig. 3, the cylinder body and liner 19 have upper openings 25 registering with passages 23 in the cylinder plug, and lower discharge openings 26 registering with plug discharge passages 24. Each plug 22 has a central axially extending bore 27 containing a tubular bushing 28 having valve slots or openings 29 and 30 communicating with passages 23 and 24, respectively.

Handle 10 has a recess 31 in its under side for reception of the cylinder, the recess having tapered side walls 32 engageable with surfaces 17 of the cylinder bore. Screws 50 extend downwardly through the handle and into the cylinder body to secure these two parts of the device rigidly together and form what is referred to in the claims as the "handle section." As seen in Fig. 6, the handle contains a central longitudinally extending air inlet passage 33 having an enlarged forward portion 34, in whose forward end inlet fitting 35 is threadedly received. Ball valve 36 is normally urged by spring 37 to close the air inlet passage by engagement with tapered valve seat 38. As seen in Fig. 3, ball 36 may be moved away from its seat to open the air inlet passage by downward displacement of valve stem 39 upon depression of valve handle 40.

Referring again to Fig. 6, the handle contains a water inlet passage 41 at one side of air inlet passage 33 and normally closed by spring pressed ball valve 42. This ball is adapted for movement away from its seat by downward movement of a valve stem 43, corresponding to stem 39 in the air system.

The air inlet fitting 35 and a corresponding water inlet fitting 43 pass through a pair of openings in plate or bracket 44 to rigidly retain that plate in the illustrated position against the handle. Valve handle 40 is pivotally mounted to plate 44 by pin 45, and serves upon depression to simultaneously open the air and water inlet valves.

Air inlet passage 33 in the handle communicates through a pair of spaced downwardly extending branches 46 with the two air inlet passages 23 in the cylinder plugs. Tubular elements 47 are received within the lower end of inlet passage branches 46 and extend downwardly through the cylinder block and liner and into the upper end of passages 23 in the cylinder plugs to interlock the plug, liner, and cylinder in the illustrated positions relative to the handle. Elements 47 are vertically located by their annular flanges 48. O-rings 49, extending about elements 47, are clamped between the handle and the cylinder body upon tightening of screws 50 to form a seal preventing any air leakage at that location.

Water inlet passage 41 in the handle extends downwardly at 51 to communicate through tubular element 52 and O-ring 53 with passage 54 in the cylinder body leading to the annular recess or water jacket 21. Water is discharged from jacket 21 through two pairs of angularly extending passages 55 leading toward the opposite sides of bottom surface 56 of the cylinder body.

Shoe 12 has a rectangular base portion 57 presenting upwardly projecting side flanges or walls 58 merging near the ends of the base into transversely extending flanges 59. Immediately at the inside of each side flange 58, the shoe removably carries an inwardly facing U-shaped track or channel guide 60 having upper and lower opposed walls 61 and 62 between which rollers 13 of the cylinder body are received. Upper walls 61 of the tracks extend beyond the sides and bottoms of the tracks for attachment to the shoe by screws 60a. Due to the vertically offset relation of the center roller at each side of the cylinder body with respect to the two end rollers, the center roller engages only upper wall 61 of the track while the other two rollers engage only the lower wall (see Fig. 9). As will be understood, such an arrangement prevents the excessive wear of both rollers and track which would occur if each roller simultaneously engaged both of the opposed track walls. The tracks are preferably formed of hard resilient metal and the distance between the upper and lower track walls is preferably slightly less than that required to accommodate the roller assembly. Consequently, each track must be slightly deformed upon assembling the device in a manner assuring against any looseness in the shoe mounting, even after considerable wear.

Shoe 12 carries a pad 63 on its under surface, about which is retained the sanding paper or cloth 64. Water discharged through passages 55 at the bottom of the cylinder body passes through elongated openings 65 in the shoe to be laterally directed by channels 66 in the upper surface of pad 63. From the outer ends of channels 66, the water is discharged directly onto the work immediately adjacent the location being sanded. To direct the water downwardly without leakage from passages 55 in the cylinder into openings 65 in the shoe, I provide a sealing element or pad 67 (see Fig. 7) received between the opposed horizontal surfaces 56 and 68 on the cylinder body and shoe respectively. Pad 67 has two pairs of elongated openings 69 along its sides corresponding to openings 65 in the shoe, and presents two upwardly projecting rectangular beads 70 each extending about one of the pairs of openings 69. These beads engage surface 56 of the cylinder body to form a seal directing all of the water downwardly through opening 65 and channels 66. Air from passages 24 in the two cylinder plugs discharges toward the ends of the device by flowing between the two rectangular beads.

Each end wall or flange 59 of the shoe has a central portion 71 projecting upwardly above the level of the side flanges and forming, in its inner surface, a vertically extending straight sided slot or recess 72 for reception of the piston rod. Each of these upwardly projecting portions 71 of the shoe carries at its outside a clamp 73 including a pivoted handle section 75 pivotally carrying a paper engaging section 76. As will be understood, upon downward swinging movement of one of the clamp handles 75, section 76 of the clamp engages the paper or cloth 64 to tightly clamp it against one of the cushions 77. These cushions are themselves carried at the ends of the shoe between walls 59 and a pair of end flanges 78.

The piston and valve assembly 14 includes a single piston 79 formed of rubber or similar resilient material and carried centrally of a piston rod 80 through finned sleeve 94, to which the piston is bonded. As seen in Figs. 3 and 11, the piston has an annular recess or groove 81 in its outer surface, and at either side of the groove, forms a pair of axially spaced annular beads 82 engaging the cylinder wall. Each of the beads 82 is of circular cross section except at its point of connection to the body of the piston. The two side faces of the piston have corresponding cavities 83 extending axially inwardly a substantial distance beyond the outer edge 182 of the corresponding bead 82. Thus, the beads project both radially and axially from the body of the piston. As a result of this piston construction, the beads always engage the cylinder wall with only the relatively light force required to form an adequate seal and never with the undesirably tight engagement of most pistons and rings. Specifically, assume the piston is being displaced to the left in Fig. 11, under the influence of compressed air admitted against its right side. Any excessive frictional engagement between the right hand bead 82 of the piston and the cylinder wall, during such movement, creates a drag tending to pull the bead back from the normal full line position of Fig. 11 toward the broken line position of that figure. Being formed as an integral part of the piston itself, the bead tends to swing inwardly upon such relative rearward displacement in a manner relieving the excessive frictional engagement with the cylinder wall. Consequently, the bead maintains only relatively light engagement with the cylinder at all times. Further, that engagement with the cylinder involves in all conditions, essentially single line contact because of the circular sectional configuration of the bead.

As will be understood, in designing a piston of the above character for use in a certain range of pressures, it is necessary that the bead be so constructed as to be displaceable between the illustrated full and broken line positions by a frictional drag of just sufficient magnitude that optimum engagement between the piston and cylinder will be maintained. Two factors of major importance in arriving at this piston design are, first, the hardness of the rubber or other resilient material from which the piston is formed, and second, the minimum thickness $t$ (see Fig. 11) of the annular connection between the bead and the body of the piston, as compared with the size of the bead itself. As an example, it has been found that, for use with pressures between 60 and 150 pounds, a piston formed substantially as illustrated in the figures should preferably be composed of rubber having a hardness of 80 as tested by the Shore method.

Piston rod 80 contains an air conducting inner passage or bore 84 at each side of the piston, and has, at each side, a lower exhaust opening 85, an upper inlet opening 86, and an opening 87 adjacent the piston, all of which openings communicate with bore 84. At its left end as seen in Fig. 3, the piston rod carries a projecting plug 88 having a straight sided end portion 89 received and guided by recess 72 in the shoe. At its other end, rod 80 carries an insert against which spring 91 is engaged to urge a relatively movable lug 92, corresponding to plug 88, into the other recess 72 formed by the shoe. Thus, the ends of the piston and valve assembly engage the end uprights 59 of the shoe in a manner transmitting reciprocating motion to the shoe while permitting relative transverse movement between the shoe and piston assembly.

In using the illustrated sander, air and water lines 93 and 94 are connected to inlet fittings 35 and 43, and a piece of sanding paper or cloth 64 is retained about the bottom of the shoe by clamps 73. Depression of valve handle 40 then opens both the air and water lines to simultaneously reciprocate the shoe relative to the handle and discharge water onto the surface being treated. In the position of Fig. 3, for instance, the left end of the piston rod is in a position admitting compressed air to the left side of the piston through the corresponding passage 23, openings 29 and 86, bore 84, and opening 87. At the same time, air to the right of the piston is being exhausted through the opening 87, bore 84, openings 85 and 30 and passage 24 at that side of the piston. Consequently, the piston is being driven to the right. As the piston nears the right side of the cylinder, the inlet and exhaust connections are reversed to introduce air to the right side of the piston and exhaust it from the left, with resulting leftward movement of the piston. This reciprocating motion of the piston is transmitted to the shoe and sanding paper through end flanges 59 of the shoe. Since the piston rod is vertically slidable at its ends within recesses 72, force exerted downwardly against the handle in using the sander is not transmitted through the piston and valve assembly to the shoe. Consequently, such downward force on the handle does not cause the transverse wear increasing thrust between the handle and the piston assembly which would occur were the piston rods rigidly attached to the shoe. Also, since the engaging shoulders of the piston assembly and the shoe are in axial alinement with the piston, the actuating force of the piston is transmitted to the shoe without any tendency for swinging the piston from its proper position of axial alinement with the cylinder.

I claim:

1. A reciprocating tool actuating device comprising a first section having a cylindrical bore, a second section extending alongside and movable relative to said first section and adapted to carry a work engaging element, a single piston received within said bore of the first section and adapted for powered reciprocation relative thereto, a pair of transverse walls at the opposite ends of said bore each containing a central axially extending opening, a pair of piston rods extending in opposite directions from said piston through said openings in the walls respectively, said second section having a pair of projections extending to locations opposite the outer ends of said rods respectively, and engaging said second section to transmit reciprocating motion of the piston thereto, said rods and said end walls containing fluid conducting passages cooperating to alternately admit pressure fluid to opposite sides of said piston and thereby effect said powered reciprocation, and said rods having end portions outwardly beyond said transverse walls and engaging said projections of the second section to transmit reciprocating motion of the piston thereto.

2. A reciprocating tool actuating device comprising a first section having an inner bore, a second section movable relative to said first section and adapted to carry a work engaging element, a piston adapted for powered reciprocation within said bore of the first section, a pair of piston rods carried by and extending in opposite directions from said piston, said rods and said first section containing fluid conducting passages cooperating to alternately admit pressure fluid to opposite sides of said piston for effecting its powered reciprocation, and rotatable bearings guiding said sections independently of the piston and rods for relative reciprocation parallel to the axis of said piston, said piston rods and said second section having shoulders engaging to transmit said powered reciprocation of the piston to said second section, said rods and said second section being relatively movable transversely of said piston at said engaging shoulders to prevent the transmission of transverse thrust therebetween.

3. A reciprocating tool actuating device comprising a first section having an inner bore, a second section movable relative to said first section and adapted to carry a work engaging element, a piston adapted for powered reciprocation within said bore of the first section, a pair of piston rods carried by and extending in opposite directions from said piston, said rods and said first section containing fluid conducting passages cooperating to alternately admit pressure fluid to opposite sides of said piston for effecting its powered reciprocation, rotatable bearings guiding said sections independently of the piston and rods for relative reciprocation parallel to the axis of said piston, said piston rods having transversely extending outer end faces engaging said second section to transmit said powered reciprocation of the piston to said second section, said rods and said second section being relatively movable transversely of said piston at said end faces of the piston to prevent the transmission of transverse thrust therebetween, and means keying said piston rod in predetermined angular relation to said first section for maintenance of said cooperating passages in a corresponding predetermined angular relation.

4. A reciprocating tool actuating device comprising a first section having an inner bore, a second section movable relative to said first section and adapted to carry a work engaging element, a piston adapted for powered reciprocation within said bore of the first section, a pair of piston rods carried by and extending in opposite directions from said piston, means guiding said sections independently of the piston and rods for relative reciprocation parallel to the axis of said piston, said piston rods and said second section having shoulders engaging to transmit said powered reciprocation of the piston to said second section, said rods and said second section being relatively movable transversely of said piston at said engaging shoulders to prevent the transmission of transverse thrust therebetween, and a spring yieldingly maintaining said shoulders in engagement.

5. A reciprocating tool actuating device comprising a handle section, containing a bore, a rigid shoe section bodily movable relative to and alongside said handle section and adapted to carry an element for engaging work, and a piston in said bore for bodily reciprocating said rigid shoe section relative to said handle section, said handle section containing a passage adapted to conduct liquid from an inlet line to a location adjacent said shoe section, said shoe section having a passage communicating with said handle passage and conducting liquid therefrom to discharge onto the work.

6. A reciprocating tool actuating device comprising a handle section, a shoe section adapted to carry an element for engaging work, a fluid pressure actuated piston for bodily reciprocating said shoe section relative to said handle section, said handle section containing a passage adapted to conduct liquid from an inlet line to a location adjacent said shoe section, said shoe section having a passage communicating with said handle passage and conducting liquid therefrom to discharge onto the work, rotatable bearings carried by one of said sections at opposite sides of the communicating ends of said passages, and guide means on the other of said sections engageable with said bearings to guide the shoe section for said reciprocating motion.

7. A reciprocating power unit for a tool actuating device comprising a body having an inner cylindrical bore, a single piston received within said bore and adapted for powered reciprocation relative thereto, a pair of transverse walls at the opposite ends of said bore each containing a central axially extending opening, a pair of piston rods extending in opposite directions from said piston through said openings in the walls respectively to engage a movable work engaging structure and transmit reciprocating motion of the piston thereto, said rods and said end walls containing fluid conducting passages cooperating to alternately admit pressure fluid to opposite sides of said piston and thereby effect said powered reciprocation, and said rods having planar end faces extending directly transversely thereof outwardly beyond said transverse walls for engaging a movable shoe to transmit reciprocating motion of the piston thereto.

8. A tool reciprocating device comprising a shoe section adapted to carry a work abrading element along a first side thereof, a handle section extending along the opposite side of said shoe section, said shoe section being reciprocable relative to said handle section, a first one of said sections including a cylinder unit and a piston unit adapted for fluid pressure actuated relative reciprocation, one of said units having shoulder means acting against the second section to transmit said reciprocation thereto, the effective force transmitting portion of said shoulder means being substantially in axial alinement with the piston and cylinder units, and said one of the units and said second section being relatively movable transversely of said axis at said shoulder means to prevent the transmission of transverse thrust therebetween, and bearing means guiding said shoe section for said reciprocation relative to the handle section.

9. A tool reciprocating device comprising a shoe section adapted to carry a work abrading element along a first side thereof, a handle section extending along the opposite side of said shoe section, a reciprocable power piston in said handle section, reduced dimension piston rod means carried by said piston and extending axially therefrom, said rod means having shoulders acting against the shoe section to transmit the powered reciprocation of the piston thereto, the effective force transmitting portions of said shoulders being substantially in axial alinement with said piston, said piston rod means and said shoe section being relatively movable transversely of the axis of the piston at said shoulders to prevent the transmission of transverse thrust therebetween, and means guiding said shoe section independently of the piston and rod means for reciprocation relative to the handle section.

10. A tool reciprocating device comprising a body including a handle section and a relatively reciprocable shoe section adapted to carry a work engaging element, said handle section containing a cylindrical bore and having a water jacket recess substantially directly adjacent but isolated from the bore, a power piston in the bore for reciprocating the shoe section relative to the handle section, said body containing inlet passage means for conducting liquid into said water jacket recess to cool the bore, and said body containing discharge passage means receiving liquid from said recess and discharging it onto the work.

11. A tool reciprocating device comprising a handle section containing a cylindrical bore and a water jacket recess extending about and substantially directly adjacent the bore but isolated therefrom, a relatively reciprocable shoe section extending alongside said handle section and adapted to carry a work engaging element, a piston in said bore and adapted for powered reciprocation to effect relative reciprocation between the sections, means for transmitting said piston reciprocation to the shoe sections, said handle section containing passage means for conducting cooling liquid to said water jacket to flow thereabout and then to a location adjacent said shoe section, and said shoe section containing passage means receiving said cooling liquid at said location and discharging it onto the work.

12. A tool reciprocating device comprising a handle section containing a cylindrical bore, a relatively reciprocable shoe section extending alongside said handle section, and adapted to carry a work engaging element, a piston in said bore and adapted for powered reciprocation to effect relative reciprocation between the sections, means for transmitting said piston reciprocation to the shoe section, said sections having a pair of opposed planar substantially parallel surfaces extending parallel to said bore and to the axis of reciprocation of the sections, said handle section containing a passage for conducting liquid from a supply line to a location at said surfaces, said shoe section containing a passage communicating with said handle passage at said surfaces and adapted to conduct liquid therefrom to discharge onto the work, and a seal pad received between said surfaces in engagement therewith to prevent leakage of said liquid outwardly between the surfaces, said pad having a planar surface engaging one of said planar surfaces on the sections and having a bead projecting toward and engaging the other section about said passage therein.

13. A tool reciprocating device comprising a handle section containing a bore, a shoe section extending alongside said handle section, a power piston in said bore, a pair of piston rods projecting in opposite directions from said piston and acting against the shoe section at their opposite ends to transmit piston reciprocation thereto, one of said rods including a main portion and a second portion carried at an end of and movable relative to said main portion and acting against the shoe section, and means yieldingly urging said second portion of said one rod axially away from the piston and into engagement with the shoe section.

14. A tool reciprocating device comprising a handle section containing a cylindrical bore, a shoe section extending alongside said handle section, a reciprocable fluid pressure actuated piston carried by said handle section within said bore and operable to reciprocate the shoe section relative thereto, a first valve carried by the handle section for controlling the admission of pressure fluid to said piston and having a movable actuating element positioned partially at the outside of the handle section, said handle section containing second passage means through which a liquid for delivery onto the work passes, a valve for controlling the delivery of liquid through said second passage means and having an actuating element positioned near and movable generally parallel to said actuating element of the first valve, and a control member movably mounted at the outside of said handle section and operable to simultaneously engage said actuating members and actuate them substantially in unison.

15. A tool reciprocating device comprising a first section containing a bore, a second section for carrying a work engaging element, a piston in said bore for relatively reciprocating said second section, a pair of axially spaced circular plugs in said bore at opposite sides of said piston forming a pair of spaced transverse walls in the bore, said plugs and first section containing registering fluid supply passages, piston rod means carried by the piston and projecting in opposite directions therefrom through said plugs, said rod means containing passage means cooperating with the plug passages to control the admission of pressure fluid to the piston, and a pair of tubes projecting into said registering passages in both the plugs and first section to key them together and conduct fluid therebetween.

16. A tool reciprocating device comprising a first section containing a bore, a second section for carrying a work engaging element, a piston in said bore for relatively reciprocating said second section, a pair of axially spaced circular plugs in said bore at opposite sides of said piston forming a pair of spaced transverse walls in the bore, a handle mounted about the first section, said plugs, first section and handle containing registering fluid supply passages, piston rod means carried by the piston and projecting in opposite directions therefrom through said plugs, said rod means containing passage means cooperating with the plug passages to control the admission of pressure fluid to the piston, and a pair of tubes projecting into said registering passages in the plugs, first section and handle to key them together and conduct fluid therebetween.

17. A tool reciprocating device comprising a handle section containing a cylindrical bore, a shoe section extending alongside said handle section parallel to the bore and adapted to carry a work engaging element at a side opposite the handle section, a piston in said bore for relatively reciprocating said sections, two spaced sets of rollers carried by said handle section, said shoe section having a pair of spaced tracks each having opposed walls at opposite sides of said rollers and engageable thereby to guide said sections for relative reciprocation, means mounting two of said rollers of each set to said handle section for rotation about spaced axes, and means mounting the third roller of each set to said handle section between said two rollers of that set and for rotation about an axis offset from a plane extending through the spaced axes of said two rollers, said two rollers of each set engaging only one of said spaced walls of the associated track and said third roller engaging only the other of said track walls.

18. A tool reciprocating device comprising a handle section having an inner bore, a relatively movable shoe section extending alongside the handle section substantially parallel to said bore and adapted to carry a work engaging element at a side opposite the handle section, a piston adapted for powered reciprocation within said bore of the handle section, a piston rod carried by and extending in opposite directions from said piston, said rod and said handle section containing fluid conducting passages cooperating to alternately admit pressure fluid to opposite sides of said piston for effecting its powered reciprocation, and rotatable bearings guiding said sections independently of the piston and rod for relative reciprocation parallel to the axis of said piston, said shoe section having a pair of projections extending to locations at opposite ends of said piston rod, said piston rod at its opposite ends and said projections of the shoe section having transversely extending shoulders engaging to transmit said powered reciprocation of the piston to the shoe section, said rod and said projections being relatively movable transversely of said piston at said engaging shoulders to prevent the transmission of transverse thrust therebetween.

19. A tool reciprocating device as recited in claim 18, in which said bearings comprise two spaced sets of rollers carried by said handle section, said device including a pair of spaced channel shaped tracks carried by said shoe section and each having a pair of opposed walls at opposite sides of said rollers and engageable thereby to guide said sections for relative reciprocation, means mounting two of said rollers of each set to said handle section for rotation about spaced parallel axes, and means mounting the third roller of each set to said handle section between said two rollers of that set and for rotation about an axis offset from a plane extending through the spaced axes of said two rollers, said two rollers of each set engaging only one of said spaced walls of the associated track and said third roller engaging only the other of said track walls.

EARNEST E. MARTIN.

REFERENCES CITED

The following references are of record in the file of this patent:

UNITED STATES PATENTS

| Number | Name | Date |
|---|---|---|
| 957,336 | Higgs | May 10, 1910 |
| 1,238,062 | Ekstrom | Aug. 21, 1917 |
| 1,365,924 | Lagerquist et al. | Jan. 18, 1921 |
| 1,506,219 | Clark | Aug. 26, 1924 |
| 1,590,353 | Ekstrom | June 29, 1926 |
| 1,700,114 | Thompson | Jan. 22, 1929 |
| 1,926,828 | Van Berkel | Sept. 12, 1933 |
| 1,953,534 | Everett | Apr. 3, 1934 |
| 1,954,489 | Partlow | Apr. 10, 1934 |
| 2,120,300 | Taylor | June 14, 1938 |
| 2,211,456 | Caldwell | Aug. 13, 1940 |
| 2,466,584 | Duff | Apr. 5, 1949 |